(12) United States Patent
Liao et al.

(10) Patent No.: US 11,650,684 B2
(45) Date of Patent: May 16, 2023

(54) TOUCH DISPLAY APPARATUS

(71) Applicant: CHAMP VISION DISPLAY INC., Miaoli County (TW)

(72) Inventors: Chun-Chien Liao, Miao-Li County (TW); Hsin-Hung Lee, Miao-Li County (TW); Hsin-Mao Chung, Miao-Li County (TW); Ching-Hung Chen, Miao-Li County (TW)

(73) Assignee: CHAMP VISION DISPLAY INC., Miao-Li County (TW)

( * ) Notice: Subject to any disclaimer, the term of this patent is extended or adjusted under 35 U.S.C. 154(b) by 0 days.

(21) Appl. No.: 17/577,027

(22) Filed: Jan. 17, 2022

(65) Prior Publication Data

US 2022/0244802 A1 Aug. 4, 2022

(30) Foreign Application Priority Data

Feb. 2, 2021 (TW) ................................ 110103825

(51) Int. Cl.
*G06F 3/041* (2006.01)
*G06F 3/0488* (2022.01)
*G06F 3/042* (2006.01)
*G09G 3/00* (2006.01)
*F21V 8/00* (2006.01)

(52) U.S. Cl.
CPC .......... *G06F 3/0412* (2013.01); *G02B 6/006* (2013.01); *G02B 6/0031* (2013.01); *G06F 3/042* (2013.01); *G06F 3/0488* (2013.01); *G09G 3/002* (2013.01)

(58) Field of Classification Search
CPC .......... G06F 3/0412; G06F 3/041–047; G06F 2203/041–04114; G06F 3/042–0428; G02B 6/006
See application file for complete search history.

(56) References Cited

U.S. PATENT DOCUMENTS

| | | | |
|---|---|---|---|
| 2010/0234094 A1* | 9/2010 | Gagner | G07F 17/3202 463/20 |
| 2013/0229828 A1* | 9/2013 | Chen | G02B 6/0076 362/616 |
| 2014/0145964 A1 | 5/2014 | Liu et al. | |

(Continued)

FOREIGN PATENT DOCUMENTS

| | | |
|---|---|---|
| CN | 110211539 | 9/2019 |
| CN | 209562872 | 10/2019 |

(Continued)

*Primary Examiner* — Sanjiv D. Patel
(74) *Attorney, Agent, or Firm* — JCIPRNET

(57) ABSTRACT

A touch display apparatus including a body, a display module, a light control element, and a touch module is provided. The body has an opening. The display module is disposed in the body and is suitable for emitting a plurality of image beams toward the opening. The light control element is disposed to overlap the opening of the body and is suitable for reflecting the image beams coming from the display module to an imaging space to display an image frame of the display module. The imaging space and the display module are located on two opposite sides of the light control element. The touch module is disposed on one side of the light control element and is configured to recognize a touch operation of a user in the imaging space.

16 Claims, 15 Drawing Sheets

(56) References Cited

U.S. PATENT DOCUMENTS

| | | | | |
|---|---|---|---|---|
| 2014/0176501 A1* | 6/2014 | Liou | ................. | G06F 3/0421 |
| | | | | 345/175 |
| 2015/0193084 A1* | 7/2015 | Juni | ................. | G03B 21/005 |
| | | | | 345/175 |
| 2021/0181403 A1* | 6/2021 | Chien | ............... | G02B 6/0053 |

FOREIGN PATENT DOCUMENTS

| | | |
|---|---|---|
| TW | I422908 | 1/2014 |
| TW | 202004265 | 1/2020 |
| WO | 2016029556 | 3/2016 |

\* cited by examiner

TOUCH DISPLAY APPARATUS

CROSS-REFERENCE TO RELATED APPLICATION

This application claims the priority benefit of Taiwan application serial no. 110103825, filed on Feb. 2, 2021. The entirety of the above-mentioned patent application is hereby incorporated by reference herein and made a part of this specification.

BACKGROUND

Technical Field

The disclosure relates to an interactive apparatus, and in particular, relates to a touch display apparatus.

Description of Related Art

Along with popularization of smart mobile apparatuses (such as smart phones, tablet computers, and smart watches), touch operation has become a mainstream mode of human-computer interaction. In particular, a display apparatus with a floating display and touch function may provide users with a more intuitive operation manner. For instance, a user may directly touch different positions of a displayed image to trigger corresponding functions, and the user may thus experience a favorable touch experience. Generally, this type of touch display apparatus includes a display with a liquid crystal panel, a light control element, and an infrared light source, and an infrared light sensor for implementing touch sensing. In order to integrate a touch space and an imaging space, the infrared light source and the infrared light sensor are arranged on two opposite sides of the light control element most of the time. Therefore, the aforementioned components of the touch display apparatus are required to be accurately aligned to achieve a good floating touch effect, which increases the difficulty of assembling the touch display apparatus.

The information disclosed in this BACKGROUND section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to a touch display apparatus requiring low production costs and exhibiting high light energy utilization efficiency.

In order to achieve one or a portion of or all of the objects or other objects, an embodiment of the disclosure provides a touch display apparatus. The touch display apparatus includes a body, a display module, a light control element, and a touch module. The body has an opening. The display module is disposed in the body. The display module is adapted to emit a plurality of image beams toward the opening. The light control element is disposed to overlap the opening of the body and is adapted to reflect the image beams coming from the display module to an imaging space to display an image frame of the display module. The imaging space and the display module are located on two opposite sides of the light control element. The touch module is disposed on one side of the light control element and is configured to recognize a touch operation of a user in the imaging space.

Based on the above description, in the touch display apparatus of an embodiment of the disclosure, the light control element is adapted to reflect the image beams emitted by the display module located on one side thereof into the imaging space located on the other side thereof. Through the self-luminous characteristic of the display module, the light energy utilization efficiency of the touch display apparatus is effectively improved. On the other hand, by arranging the touch module around the imaging space, an assembling alignment process of the touch display apparatus is effectively simplified, and overall production costs are thereby reduced.

To make the aforementioned more comprehensible, several embodiments accompanied with drawings are described in detail as follows.

Other objectives, features and advantages of the disclosure will be further understood from the further technological features disclosed by the embodiments of the disclosure wherein there are shown and described preferred embodiments of the disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 10A to FIG. 10C are schematic front views of a plurality of light guide plates of FIG. 9.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
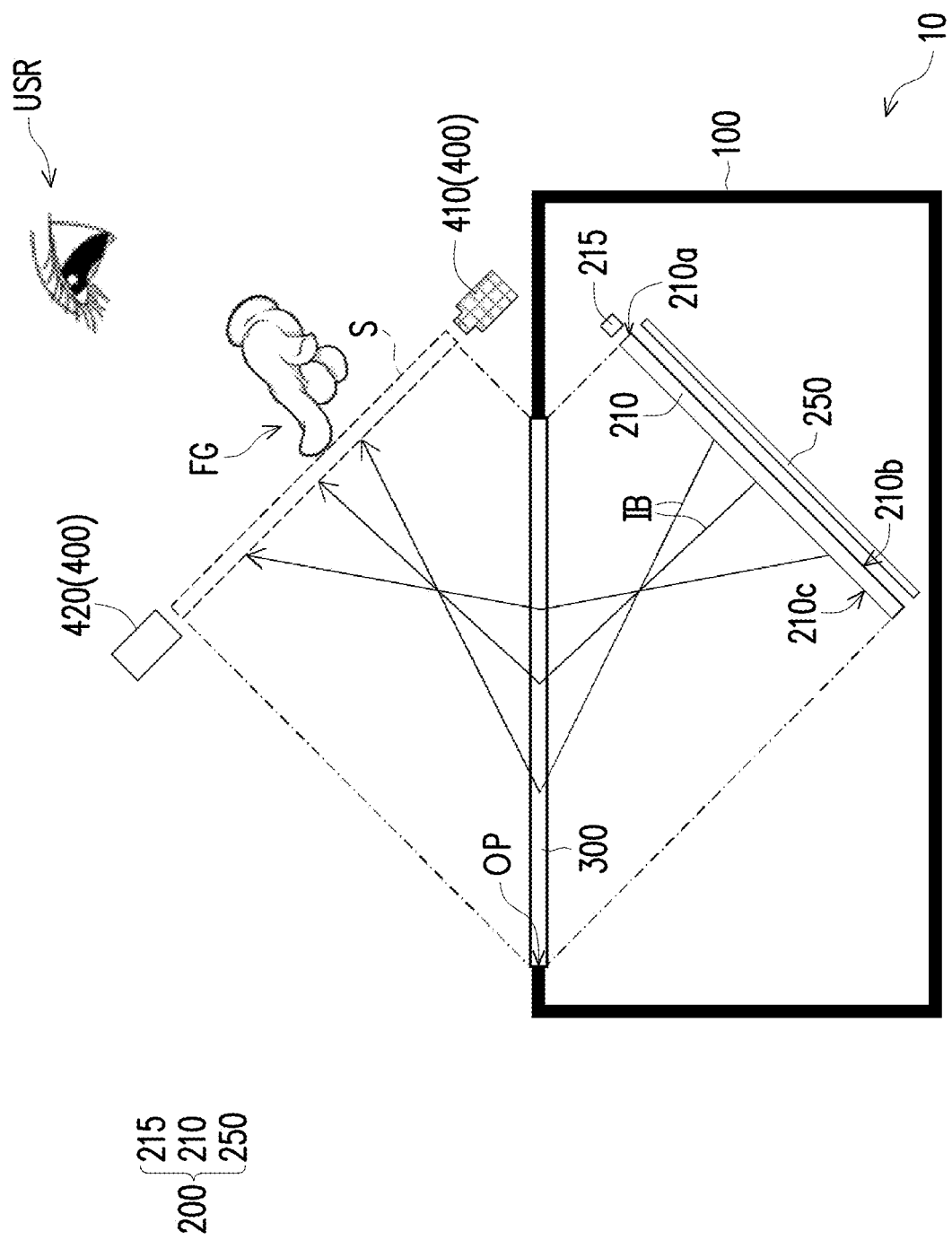
FIG. 1 is a schematic side view of a touch display apparatus according to a first embodiment of the disclosure.
Figure 3:
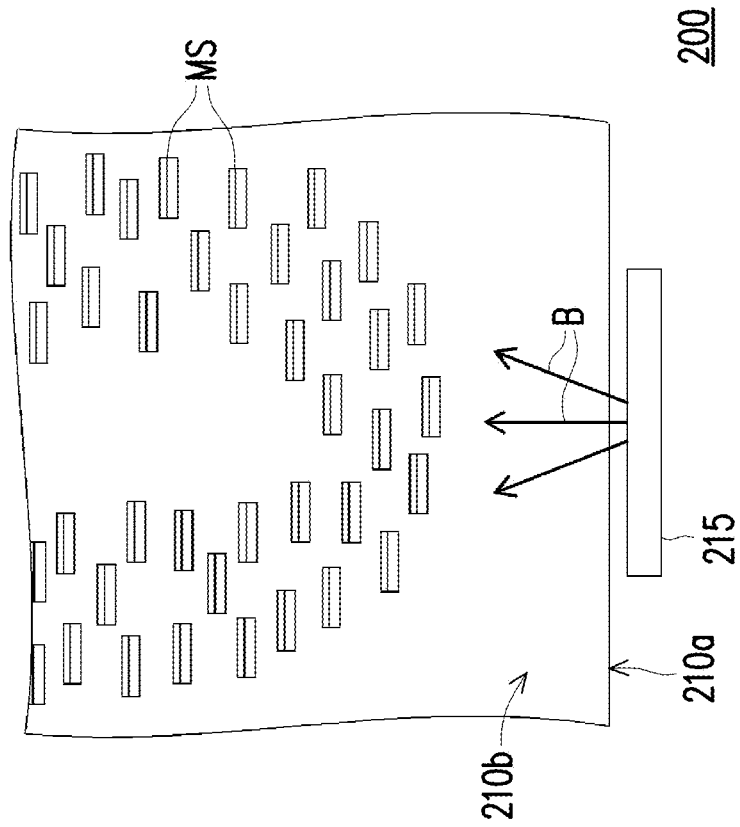
FIG. 3 is a schematic enlarged bottom view of a partial region of the display module of FIG. 2.
Figure 2:
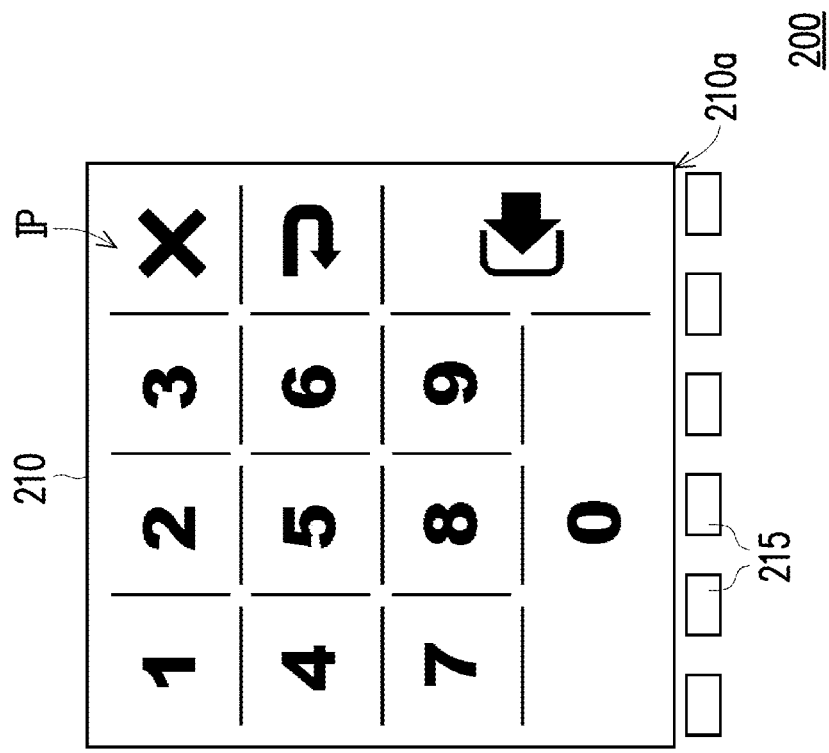
FIG. 2 is a schematic front view of a display module of FIG. 1.
Figure 4:
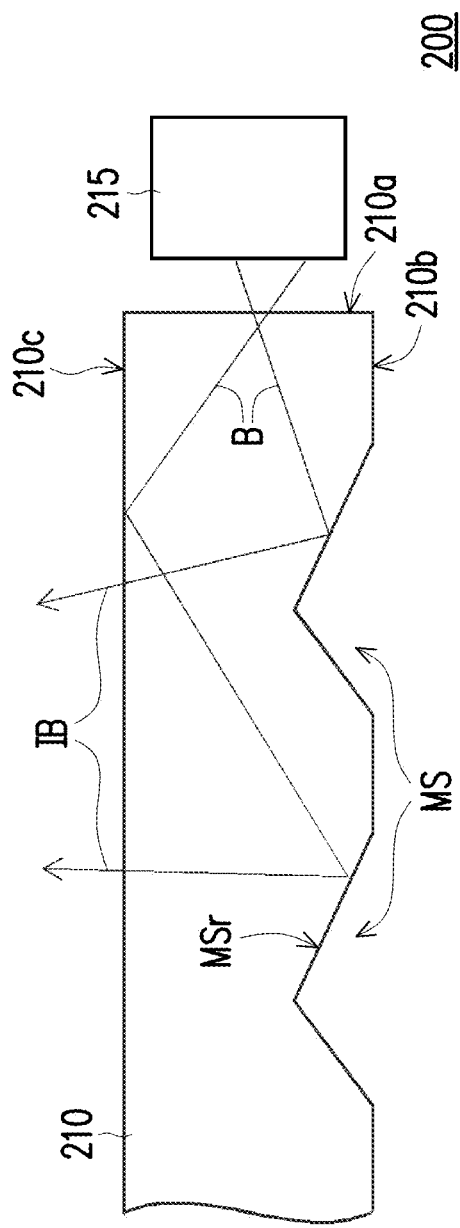
FIG. 4 is a schematic cross-sectional view of a partial region of the display module of FIG. 2.
Figure 5:
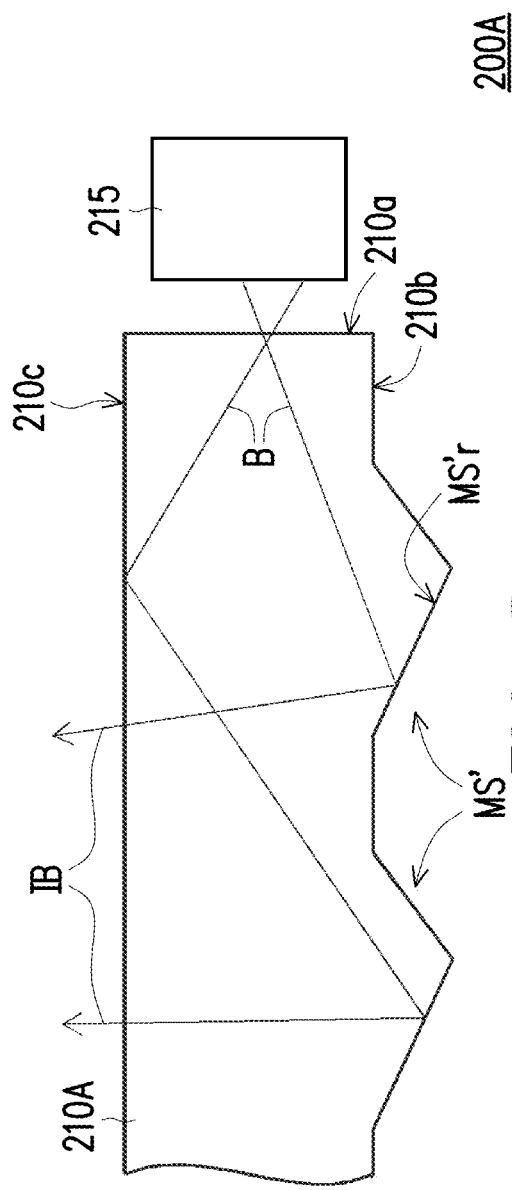
FIG. 5 is a schematic cross-sectional view of a partial region of a display module according to another embodiment of the disclosure.
Figure 6:
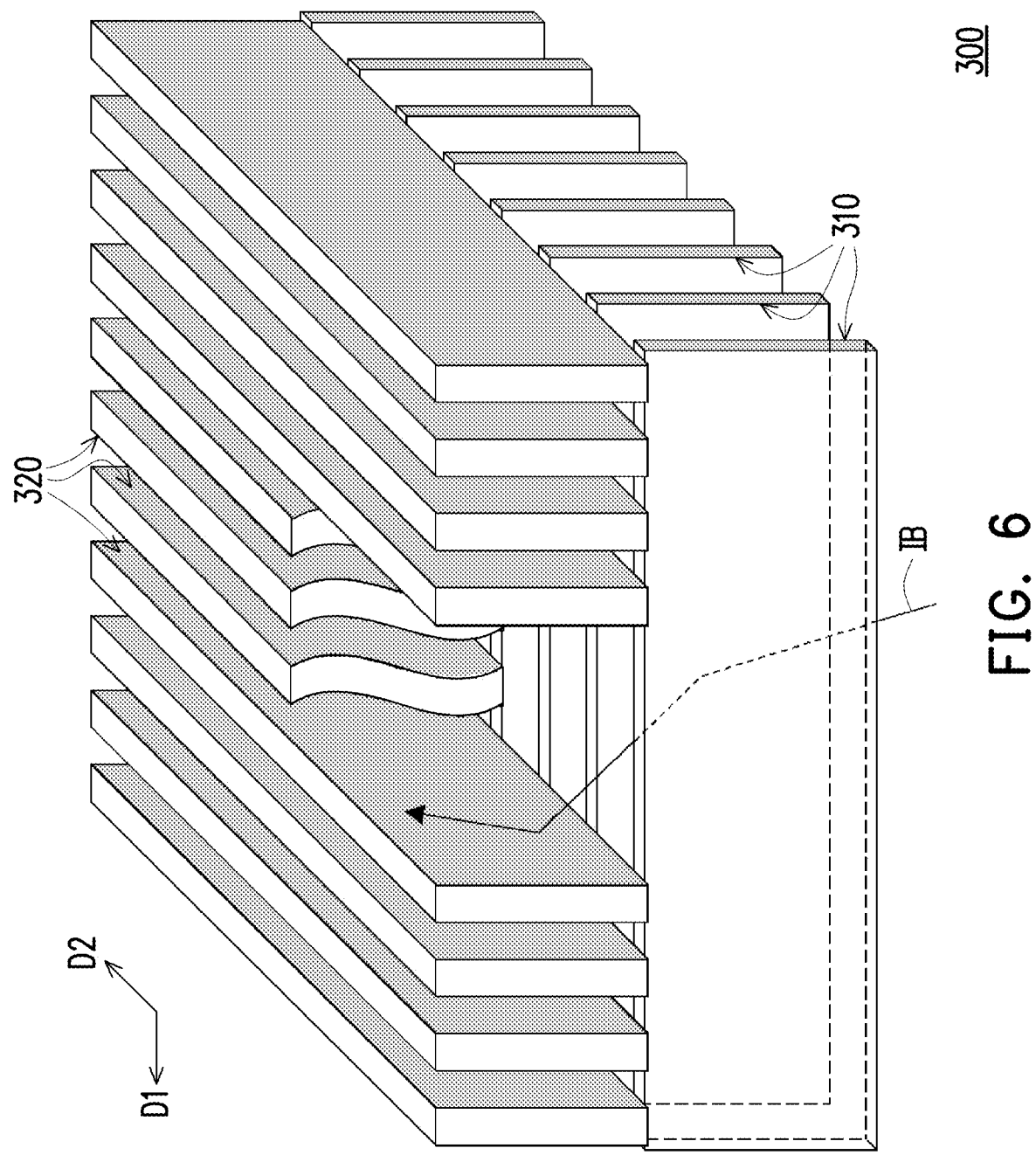
FIG. 6 is a schematic view of a light control element of FIG. 1.
Figure 7:
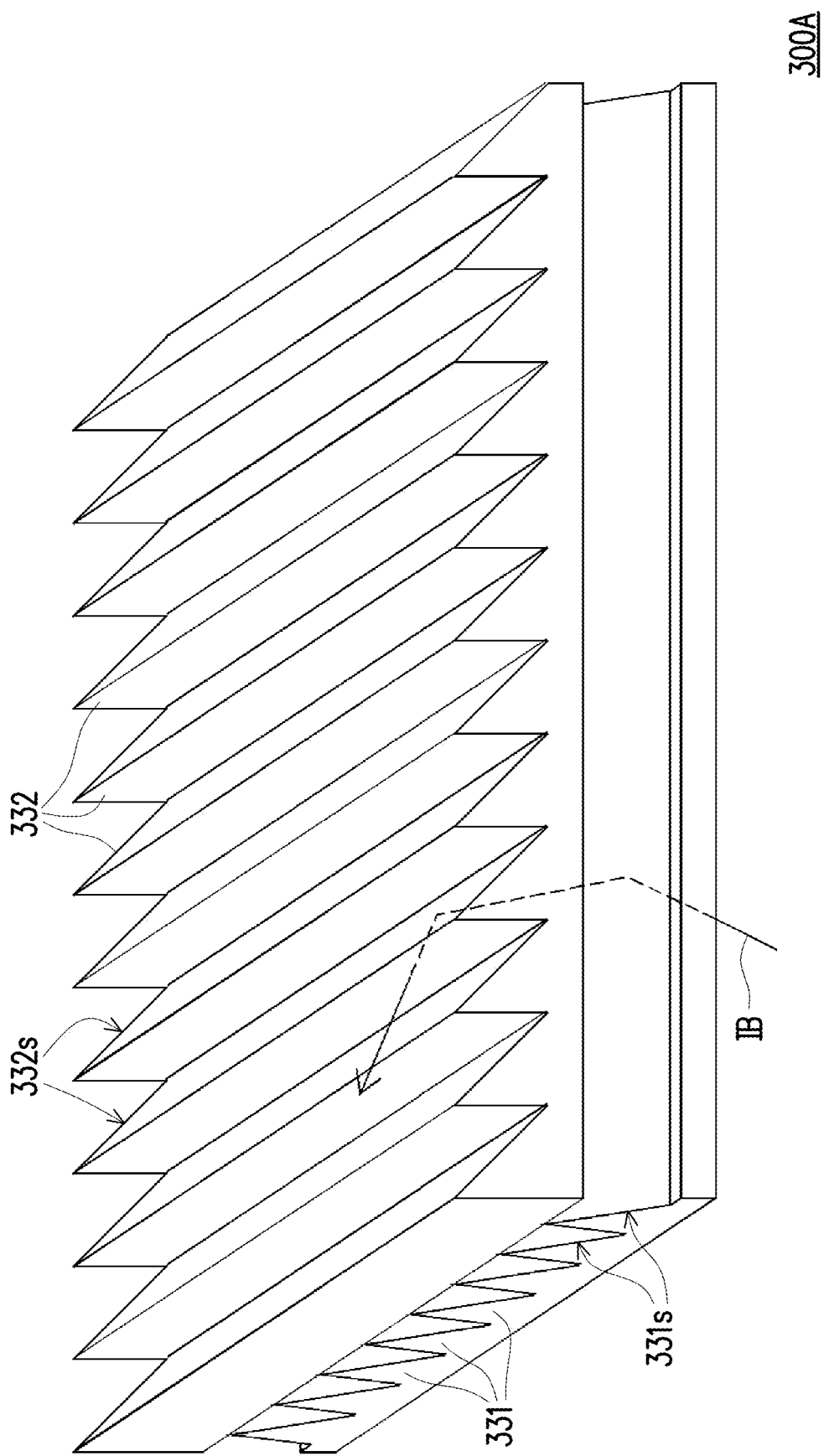
FIG. 7 is a schematic view of a light control element according to another embodiment of the disclosure.
Figure 8:
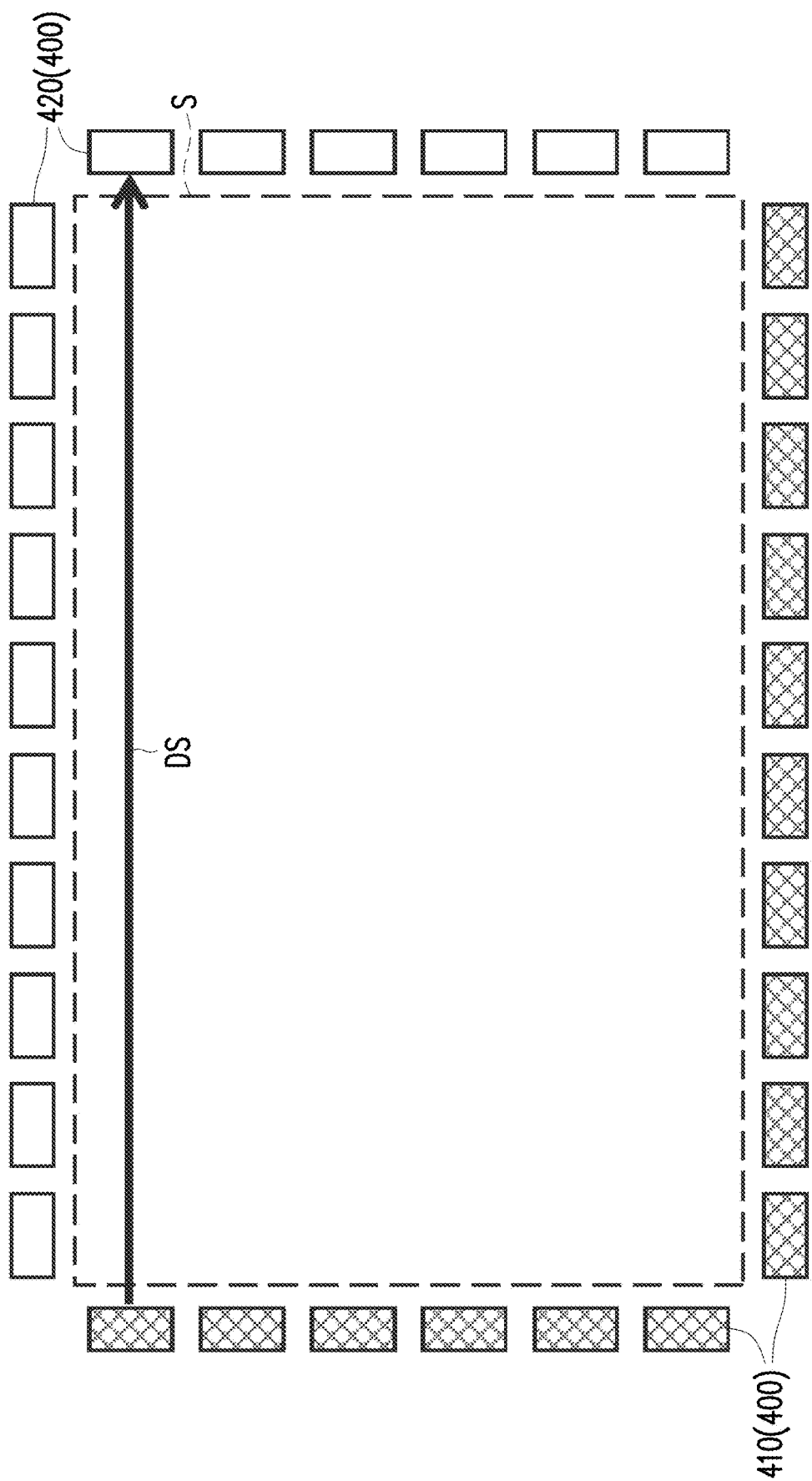
FIG. 8 is a schematic front view of an imaging space and a touch module of the touch display apparatus of FIG. 1.

FIG. 1 is a schematic side view of a touch display apparatus according to a first embodiment of the disclosure. FIG. 2 is a schematic front view of a display module of FIG. 1. FIG. 3 is a schematic enlarged bottom view of a partial region of the display module of FIG. 2. FIG. 4 is a schematic cross-sectional view of a partial region of the display module of FIG. 2. FIG. 5 is a schematic cross-sectional view of a partial region of a display module according to another embodiment of the disclosure. FIG. 6 is a schematic view of a light control element of FIG. 1. FIG. 7 is a schematic view of a light control element according to another embodiment of the disclosure. FIG. 8 is a schematic front view of an imaging space and a touch module of the touch display apparatus of FIG. 1. In particular, for clarity of presentation and description, a reflector 250 of FIG. 1 is omitted in FIG. 4.

Referring to FIG. 1, a touch display apparatus 10 includes a body 100, a display module 200, and a light control element 300. The body 100 has an opening OP. The display module 200 is disposed in the body 100 and is adapted to emit a plurality of image beams IB toward the opening OP. The light control element 300 is disposed to overlap the opening OP of the body 100 and is adapted to reflect the image beams IB coming from the display module 200 to an imaging space S to present an image frame of the display module 200.

It should be noted that the imaging space S and the display module 200 are located on two opposite sides of the light control element 300. For example, in the embodiment, the display module 200 and the imaging space S are mirror-symmetrical while treating the light control element 300 as a center of symmetry. However, the disclosure is not limited thereto, and in other embodiments, the display module 200 and the imaging space S are not mirror-symmetrical relative to the light control element 300, as long as the imaging space S is located outside the body 100. In the embodiment, the display module 200 (or the imaging space S) is disposed obliquely relative to the light control element 300, wherein the display module 200 located in the body 100 is disposed closed to a side end of the control element 300, and the imaging space S located outside the body 10 is also disposed closed to the side end of the control element 300.

Referring to FIG. 2 to FIG. 4 together, the display module 200 includes a light guide plate 210, a light source 215, and a plurality of optical microstructures MS. The light guide plate 210 has a light incident surface 210a and a bottom surface 210b connected to the light incident surface 210a, and the light source 215 is disposed at one side of the light incident surface 210a of the light guide plate 210. The optical microstructures MS are disposed on the bottom surface 210b of the light guide plate 210 and form an image pattern IP (as shown in FIG. 2). For example, in this embodiment, the image pattern IP may be a numeric keyboard, which is suitable for allowing a user USR to input a numeric string, but the disclosure is not limited thereto. In other embodiments, the image pattern IP may also include images, characters (such as Chinese characters, English characters, or a combination of characters of multiple languages), or a combination thereof.

In detail, in this embodiment, the optical microstructures MS may be groove structures recessed into the bottom surface 210b of the light guide plate 210, and a vertical projection contour of a region occupied by the groove structure on the bottom surface 210b may be rectangular, but the disclosure is not limited thereto. In other embodiments, the optical microstructure MS' of the display module 200A may also be convex structures protruding out of the bottom surface 210b of the light guide plate 210A (as shown in FIG. 5), and a vertical projection contour of a region occupied by the convex structure on the bottom surface 210b may include arc segments (not shown).

In this embodiment, the light source 215 of the display module 200 is adapted to emit a plurality of light source beams B toward the light incident surface 210a of the light guide plate 210. The light source beams B are transmitted laterally to the plurality of optical microstructures MS located on the bottom surface 210b through at least one total internal reflection in the light guide plate 210, and the light source beams B may be reflected by a light facing surface MSr of each of the optical microstructures MS to emit out of the light emitting surface 210c of the light guide plate 210, so as to form the aforementioned multiple image beams IB. To be specific, in the embodiment, the light source beams B directly emitted by the light source 215 are reflected by the image pattern IP formed by the optical microstructures MS in the light guide plate 210 and emit out through the light emitting surface 210c of the light guide plate 210 to form the image beams IB, and the image beams are not formed by a non-self-luminous element such as a conventional liquid crystal display panel, etc.

In the embodiment, the light source 215 is, for example, a light emitting diode (LED) element, and the light source beams B emitted by the light source 215 lose less light energy after being transmitted by the light guide plate 210 and reflected by the optical microstructure MS. In other words, the display module 200 (or the touch display apparatus 10) of the embodiment may have characteristics similar to that of a self-luminous display panel (i.e., have high light energy utilization efficiency).

It should be noted that in the embodiment, the number of the light sources 215 disposed at one side of the light incident surface 210a of the light guide plate 210 is, for example, six, but the disclosure is limited by the content of the drawings. In other embodiments, the number of the light sources 215 may be adjusted according to an actual product design (for example, a size of the light guide plate 210 or a display brightness value). In order to further increase the light energy utilization efficiency of the light source 215, the display module 200 may further include the reflector 250 disposed on one side of the bottom surface 210b of the light guide plate 210, and the reflector 250 is, for example, a white reflector, an aluminum reflector, a silver film, or an aluminum film, but the disclosure is not limited thereto.

Referring to FIG. 1 and FIG. 6, the light control element 300 is disposed on the transmission path of the image beams IB coming from the display module 200. For example, in the embodiment, the light control element 300 has a plurality of first mirror surfaces 310 and a plurality of second mirror surfaces 320. The first mirror surfaces 310 are spaced apart from each other and extend in a first direction D1, and the second mirror surfaces 320 are spaced apart from each other and extend in a second direction D2. More specifically, the first direction D1 intersects the second direction D2, i.e., the first mirror surfaces 310 and the second mirror surfaces 320 are disposed in an intersecting manner.

The image beams IB coming from the display module 200 exit the opening OP of the body 100 after being sequentially reflected by the first mirror surfaces 310 and the second mirror surfaces 320, and is transmitted to the imaging space S located outside the body 100 to form an image frame, and the image frame may be seen by the user USR. In the embodiment, the image frame seen by the user USR in the imaging space S is the image pattern IP (as shown in FIG. 2) formed by a plurality of the optical microstructures MS on the light guide plate 210. However, the disclosure is not limited thereto, according to other embodiments, the light control element 300A may also be a combination of two prisms, i.e., first prisms 331 and second prisms 332, where extending directions of prism structures of the two prisms intersect each other (as shown in FIG. 7), and one of slopes of the prism structure of each prism (for example, a slope 331s of the first prism 331 and a slope 332s of the second prism 332) is a mirror surface.

It should be noted that in the embodiment, the number of times of reflections of the image beams IB coming from the display module 200 in the light control element 300 is, for example, two, but the disclosure is not limited thereto. In other embodiments, the number of times of reflections of the image beams IB in the light control element may be adjusted according to an actual optical design or product requirements.

Further, the touch display apparatus 10 further includes a touch module 400, which is disposed at one side of the light control element 300 where the imaging space S is provided, and is configured to recognize a touch operation of the user USR in the imaging space S. Referring to FIG. 8, in the embodiment, the touch module 400 may include a plurality of transmitters 410 and a plurality of receivers 420, the transmitters 410 and the receivers 420 are disposed around the imaging space S in a sight line direction of the user USR. For example, a part of the transmitters 410 and a part of the receivers 420 are located on two opposite sides of the imaging space S in the horizontal direction, and the other part of the transmitters 410 and the other part of the receivers 420 are located on two opposite sides of the imaging space S in the vertical direction, but the disclosure is not limited thereto.

The transmitters 410 of the touch module 400 are used to send a detection signal DS to the corresponding receivers 420, and the receivers 420 are adapted to receive at least a part of the detection signals DS from the transmitters 410 to recognize the touch operation of the user USR. For example, when the user USR uses a finger FG to perform a touch operation according to the displayed image frame (such as the image pattern IP of FIG. 2), a part of the detection signals DS may be blocked by the finger FG and cannot be received by the corresponding receivers 420 to cause a change of the signals. A position touched by the user USR may be recognized through the change of the signals. In the embodiment, the detection signals DS are, for example, infrared light or ultrasound, but the disclosure is not limited thereto.

It should be noted that since the touch module 400 is disposed around the imaging space S, the need for alignment between the touch module 400 and the display module 200 (or between the touch module 400 and the light control element 300) may be eliminated. In other words, an assembling alignment process of the touch display apparatus 10 may be effectively simplified, thereby reducing the overall production cost.

Hereinafter, other embodiments are provided to describe the disclosure in detail, where the same reference numbers denote the same or like components, and descriptions of the same technical contents are omitted. The aforementioned embodiment may be referred for descriptions of the omitted parts, and detailed descriptions thereof are not repeated in the following embodiments.

Figure 9:
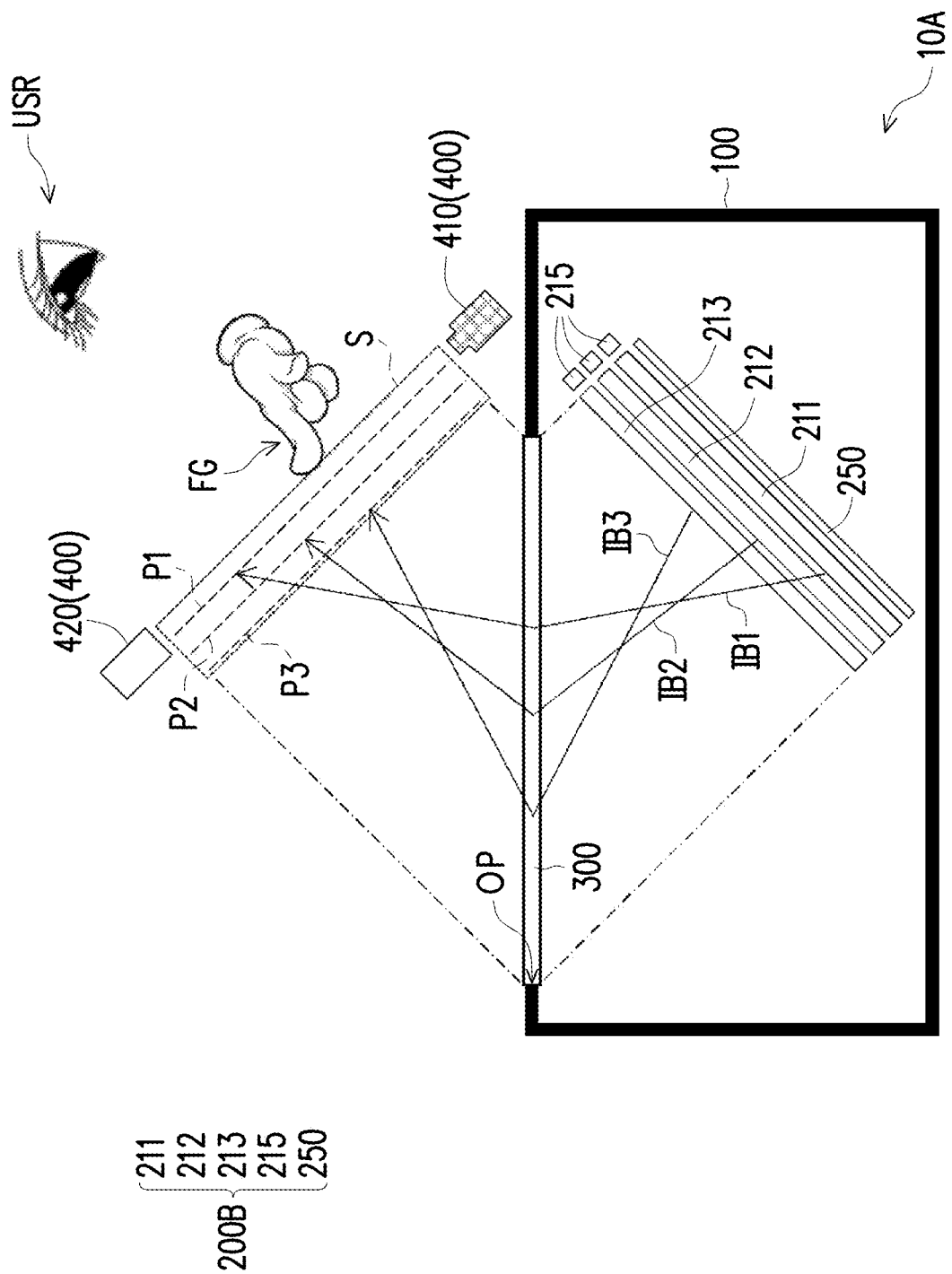
FIG. 9 is a schematic side view of a touch display apparatus according to a second embodiment of the disclosure.
Figures 10A, 10B, 10C:
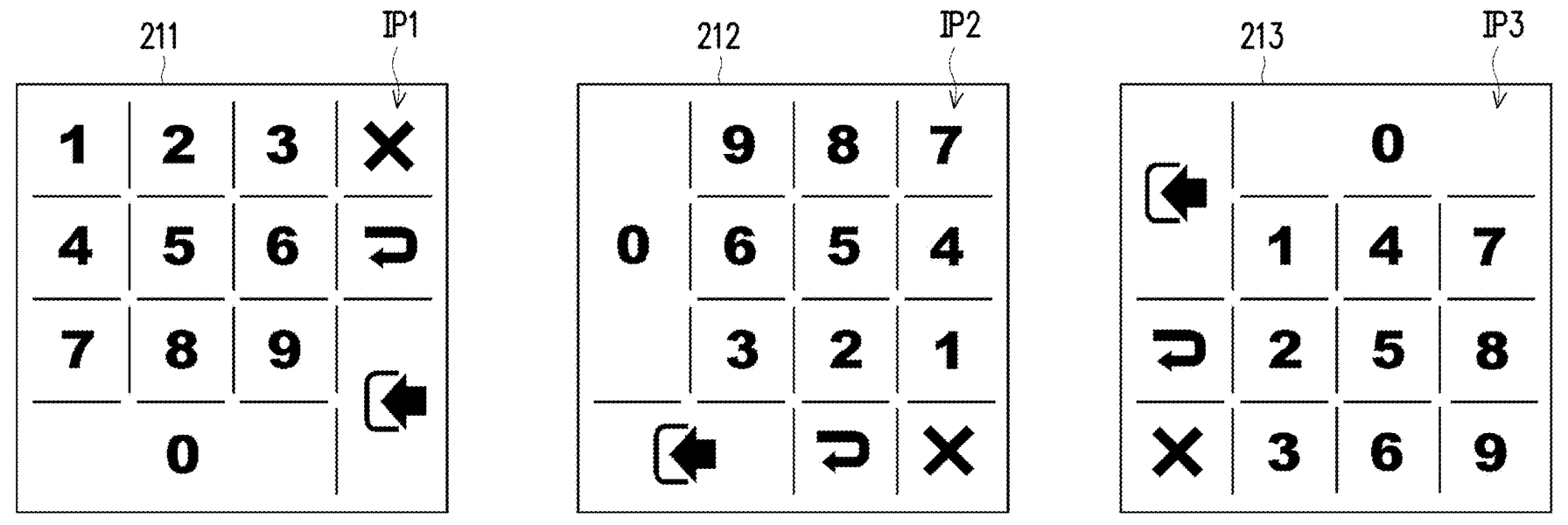

FIG. 9 is a schematic side view of a touch display apparatus according to a second embodiment of the disclosure. FIG. 10A to FIG. 10C are schematic front views of a plurality of light guide plates of FIG. 9. Referring to FIG. 9, a difference between a touch display apparatus 10A of the embodiment and the touch display apparatus 10 of FIG. 1 is that the numbers of light guide plates and light sources are different. Specifically, the number of the light guide plates of the touch display apparatus 10A is three, namely a first light guide plate 211, a second light guide plate 212, and a third light guide plate 213. Accordingly, the number of the light sources 215 is triple (i.e., eighteen) of the number of the light sources 215 of FIG. 2.

In the embodiment, the light guide plates are disposed in the body 100 in an overlapping manner. Since a configuration relationship between each of the light guide plates and the light source 215 is similar to that of the display module 200 of FIG. 2, detailed description thereof may refer to the relevant paragraphs of the aforementioned embodiment, which is not be repeated here.

Referring to FIG. 10A to FIG. 10C together, the image patterns formed by the optical microstructures (not shown) of the light guide plates of the embodiment are all different. For example, the part of number keys in a first image pattern IP1 formed by the multiple optical microstructures of the first light guide plate 211 is formed on a left side of the first light guide plate 211 of FIG. 10A, the part of number keys in a second image pattern IP2 formed by the multiple optical microstructures of the second light guide plate 212 is formed on an upper side of the second light guide plate 212 of FIG. 10B, and the part of number keys in a third image pattern IP3 formed by the multiple optical microstructures of the third light guide plate 213 is formed on a right side of the third light guide plate 213 of FIG. 10C, and arrangement orders of the number keys are different from each other.

In this embodiment, imaging positions of the first image pattern IP1 on the first light guide plate 211, the second image pattern IP2 on the second light guide plate 212, and the third image pattern IP3 on the third light guide plate 213 in the imaging space S are different from each other. For example, a plurality of first image beams IB1 coming from the first light guide plate 211 form a first image frame (i.e., the first image pattern IP1) on a first position P1 of the imaging space S after being reflected by the light control element 300, a plurality of second image beams IB2 coming from the second light guide plate 212 form a second image frame (i.e., the second image pattern IP2) on a second position P2 of the imaging space S after being reflected by the light control element 300, and a plurality of third image beams IB3 coming from the third light guide plate 213 form a third image frame (i.e., the third image pattern IP3) on a third position P3 of the imaging space S after being reflected by the light control element 300.

For example, when the user USR operates the touch display apparatus 10A, the light source 215 corresponding to one of the light guide plates of the display module 200B is enabled. In other words, only the image pattern of one light guide plate is presented in the imaging space S. At this time, the light guide plates corresponding to the unenabled light sources 215 do not substantially change a light path of the transmitted image beam. It should be noted that the exemplified operation mode may be applied to an automated teller machine (ATM). Accordingly, when the user USR wants to enter a password, the system may randomly select the light guide plate to be lighted to avoid being peeped by others and record the key positions, which helps to improve system security. However, the disclosure is not limited thereto, and in other embodiments, the number of the lighted light guide plates in the display module of the touch display apparatus may be adjusted to two or more according to an actual application requirement.

Figure 11:
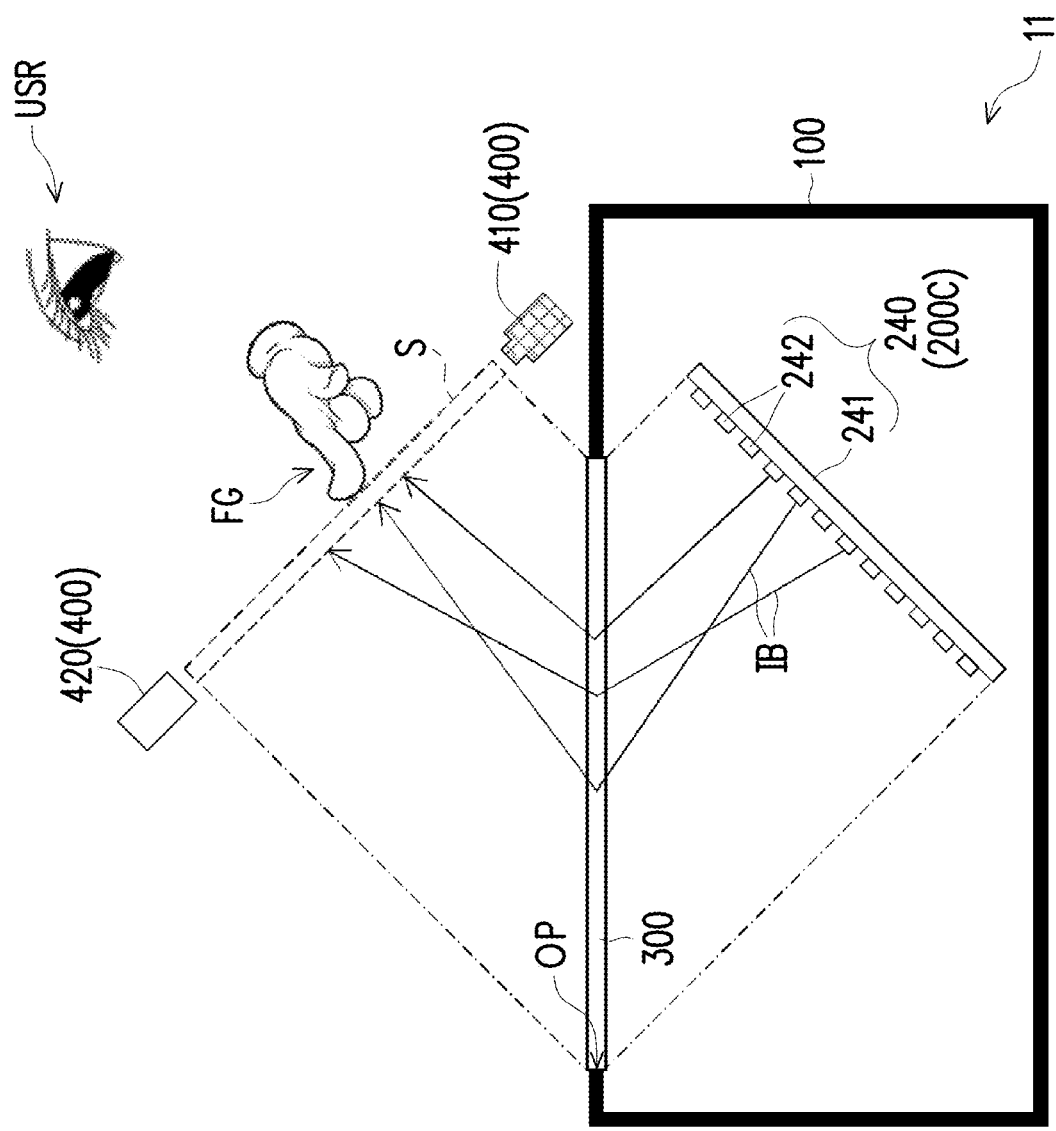
FIG. 11 is a schematic side view of a touch display apparatus according to a third embodiment of the disclosure.

FIG. 11 is a schematic side view of a touch display apparatus according to a third embodiment of the disclosure. Referring to FIG. 11, a difference between a touch display apparatus 11 of the embodiment and the touch display apparatus 10 of FIG. 1 is only that: the composition of the display module is different. Specifically, a display module 200C of the touch display apparatus 11 has a circuit substrate 241 and a plurality of light emitting elements 242 disposed on the circuit substrate 241 in a matrix or other distributed manner, where the circuit substrate 241 may individually control the light emitting elements 242 to display images. Namely, in the embodiment, the display module 200C is a self-luminous display panel 240, such as a micro light emitting diode (micro-LED) panel, a mini light emitting diode (mini-LED) panel or an organic light emitting diode (OLED) panel. Therefore, the touch display apparatus 11 of the embodiment may display dynamic images.

Figure 12:
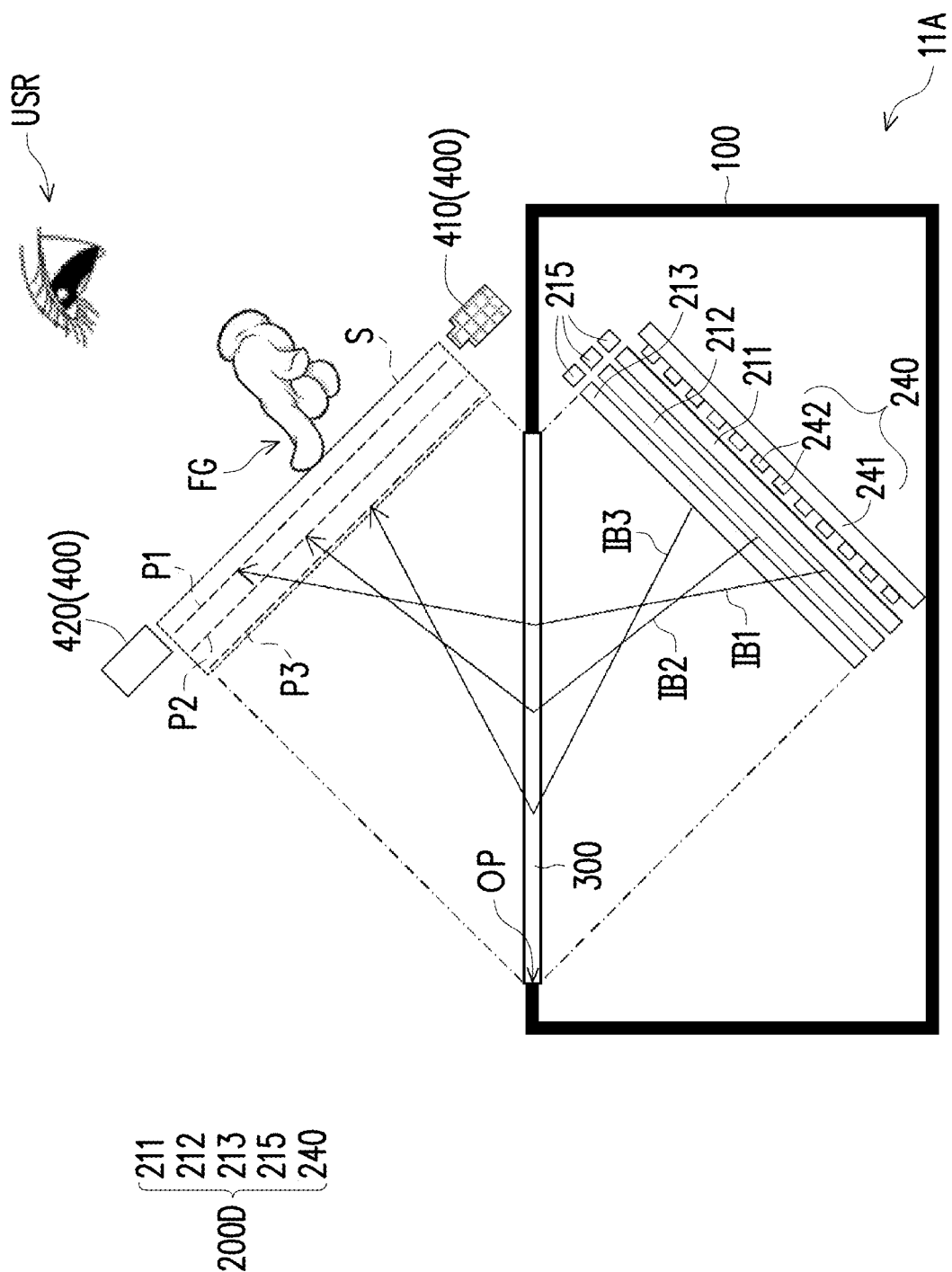
FIG. 12 is a schematic side view of a touch display apparatus according to a fourth embodiment of the disclosure.

FIG. 12 is a schematic side view of a touch display apparatus according to a fourth embodiment of the disclosure. Referring to FIG. 12, a difference between a touch display apparatus 11A of the embodiment and the touch display apparatus 10A of FIG. 9 is that the composition of the display module is different. In the embodiment, a display module 200D uses the self-luminous display panel 240 of FIG. 11 to replace the reflector 250 of the display module 200B of FIG. 9. Therefore, detailed description of the display module 200D may refer to the relevant paragraphs of the aforementioned embodiment, which is not repeated here.

For example, in this embodiment, when the finger FG of the user USR touches a certain number key of the image frame in the imaging space S, the corresponding light emitting element 242 on the self-luminous display panel 240 may be enabled to serve as a feedback signal for successfully inputting an instruction. Accordingly, application flexibility of the touch display apparatus 11A may be increased.

Figure 13A:
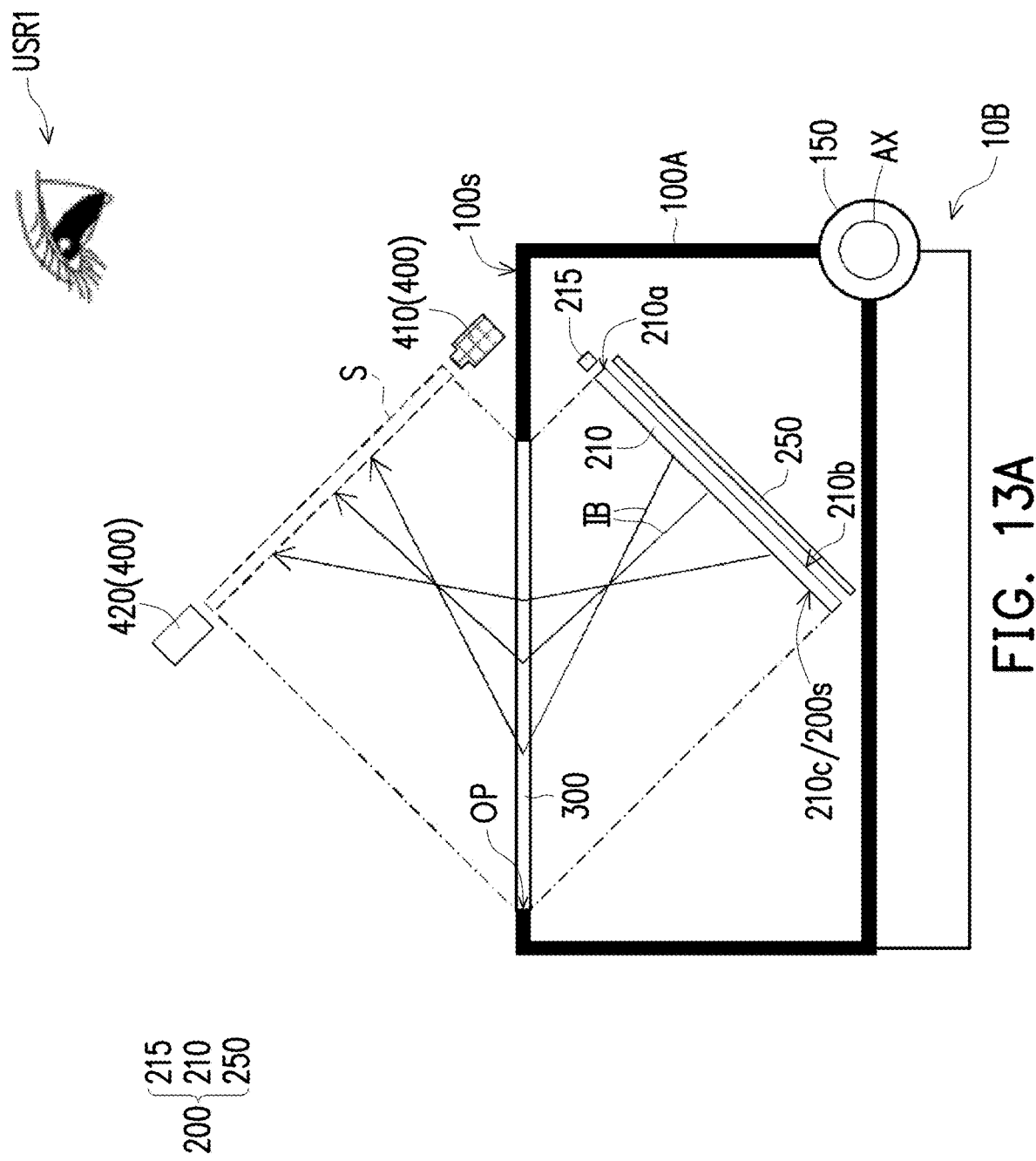
FIG. 13A and FIG. 13B are schematic side views of a touch display apparatus according to a fifth embodiment of the disclosure.
Figure 13B:
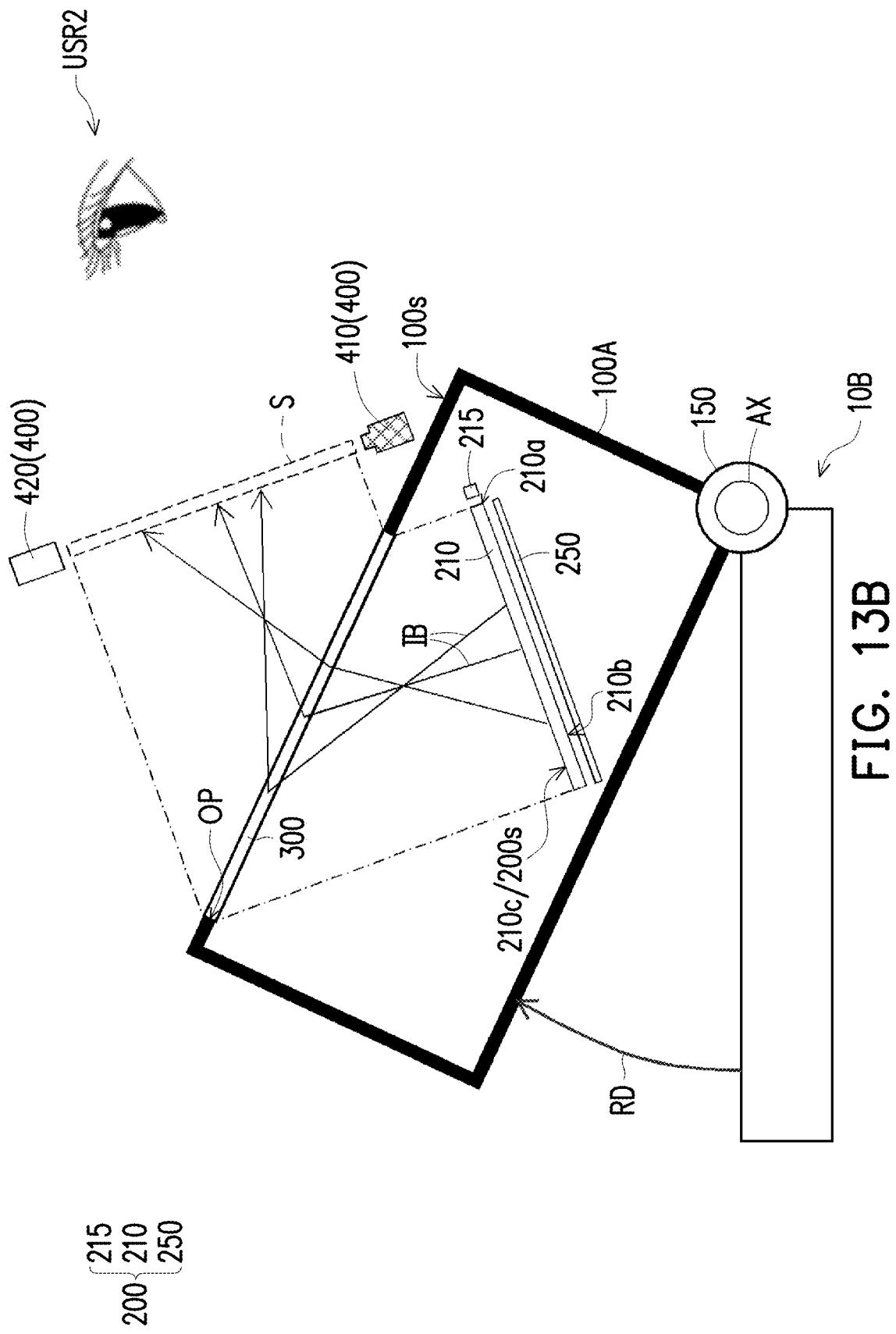

FIG. 13A and FIG. 13B are schematic side views of a touch display apparatus according to a fifth embodiment of the disclosure. Referring to FIG. 13A and FIG. 13B, a difference between a touch display apparatus 10B of the embodiment and the touch display apparatus 10 of FIG. 1 is that the touch display apparatus 10B further includes a rotating mechanism 150 disposed on the body 100A. To be specific, the rotating mechanism 150 is adapted to drive the body 100A, the light control element 300, the display module 200 and the imaging space S to rotate synchronously along a rotating shaft AX. The rotating shaft AX is parallel to a light emitting surface 200s of the display module 200 (or a light emitting surface 210c of the light guide plate 210) and a surface 100s of the body 100A where the light control element 300 is provided.

It should be noted that through the configuration of the rotating mechanism 150, the touch display apparatus 10B may be individually set for users with different heights, so that the operating experience of each user is optimized. For example, when a user USR1 operates the touch display apparatus 10B, the rotating mechanism 150 does not operate (as shown in FIG. 13A). When a user USR2 with a shorter height wants to operate, the body 100A, the imaging space S, the display module 200 and the light control element 300 of the touch display apparatus 10B are driven by the rotating mechanism 150 to rotate relative to the rotating shaft AX along a direction RD to reach a position where the user USR2 may directly look at the image frame (as shown in FIG. 13B).

Figure 14:
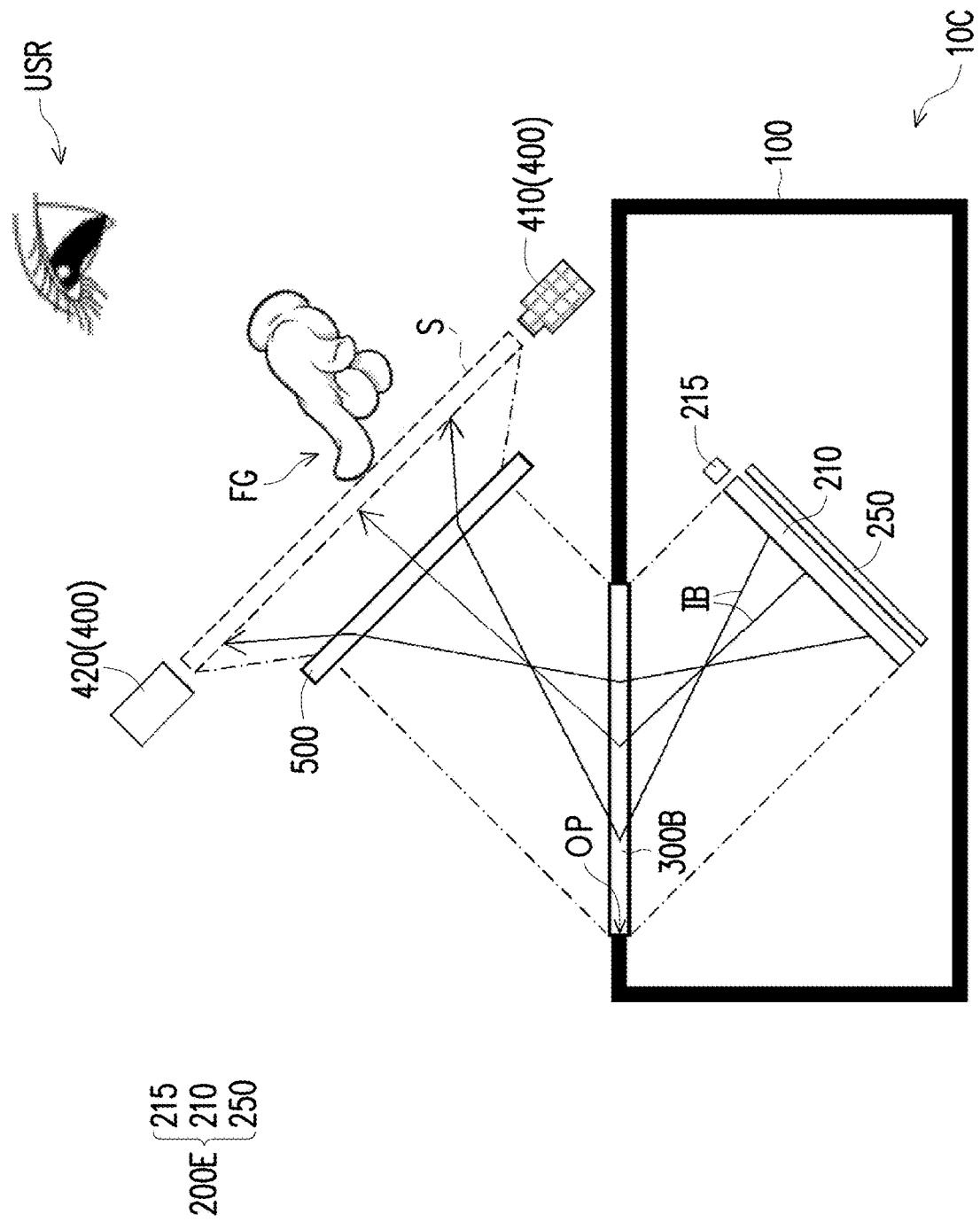
FIG. 14 is a schematic side view of a touch display apparatus according to a sixth embodiment of the disclosure.

FIG. 14 is a schematic side view of a touch display apparatus according to a sixth embodiment of the disclosure. Referring to FIG. 14, a difference between a touch display apparatus 10C of the embodiment and the touch display apparatus 10 of FIG. 1 is that the touch display apparatus 10C further includes a Fresnel lens 500, which is disposed on a transmission path of the image beams IB coming from a light control element 300B, and is located between the light control element 300B and the imaging space S. Through the configuration of the Fresnel lens 500, sizes of the light control element 300B and a display module 200E may be effectively reduced, thereby reducing the production cost of the touch display apparatus 10C.

It should be noted that in this embodiment, the number of the Fresnel lenses 500 is, for example one, but the disclosure is limited by the content of the drawings. In other embodiments, the number of the Fresnel lenses 500 may be adjusted according to an actual optical design or product specifications.

Figure 15:
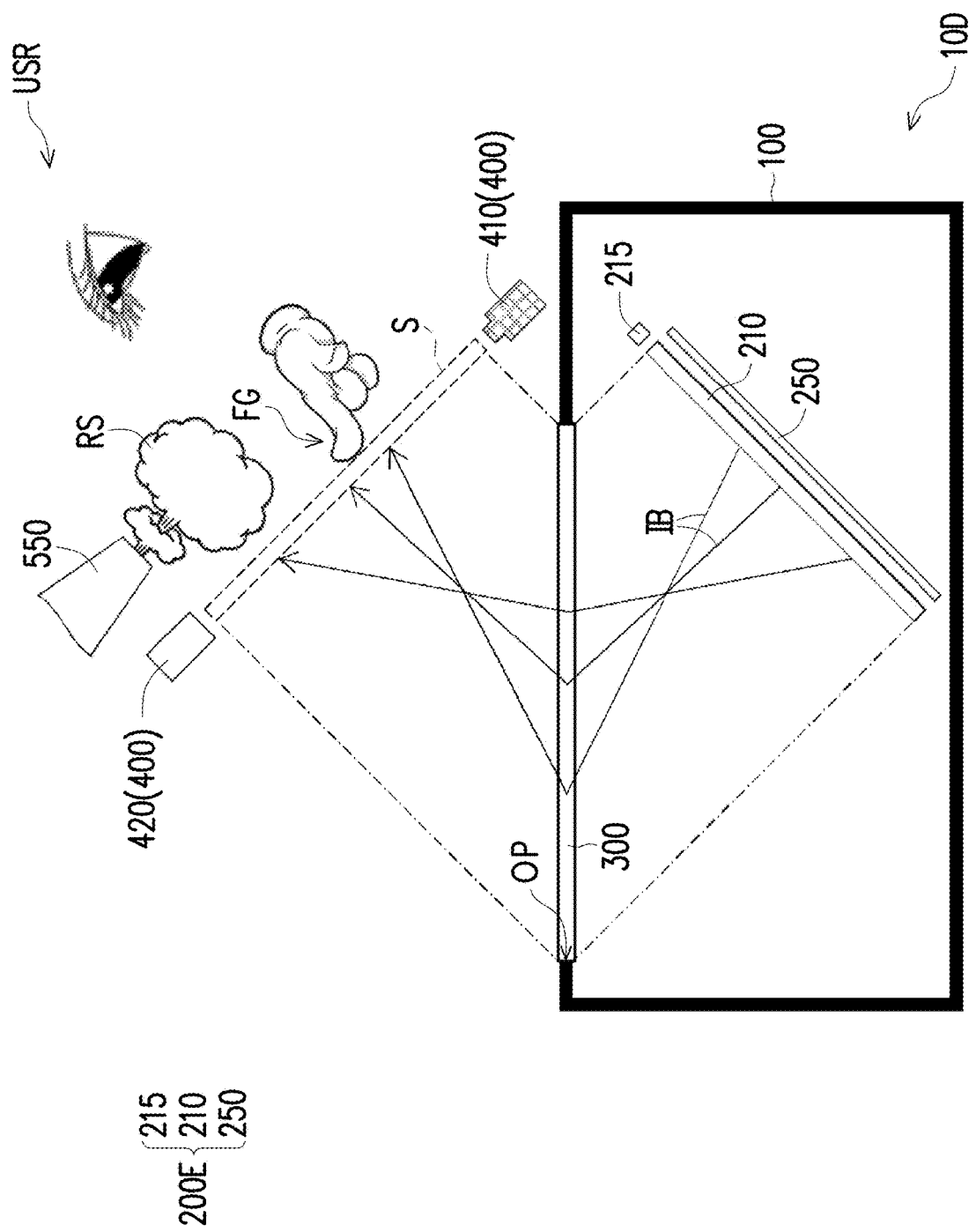
FIG. 15 is a schematic side view of a touch display apparatus according to a seventh embodiment of the disclosure.

FIG. 15 is a schematic side view of a touch display apparatus according to a seventh embodiment of the disclosure. Referring to FIG. 15, a difference between a touch display apparatus 10D of the embodiment and the touch display apparatus 10 of FIG. 1 is that the touch display apparatus 10D further includes a touch prompt element 550. The touch prompt element 550 may be disposed near the imaging space S, and is suitable for sending a prompt signal RS after the touch module 400 detects a touch operation of the user USR.

For example, in this embodiment, the touch prompt element 550 is, for example, an air jet element, and is used to generate a jet airflow. The jet airflow may be jetted toward a hand of the user USR performing the touch operation to serve as a feedback signal for successfully inputting an instruction. Accordingly, application flexibility of the touch display apparatus 10D may be increased. It should be understood that in other embodiments, the touch prompt element may also be a speaker, and is used to generate a prompt sound to serve as a feedback signal for successfully inputting the instruction.

Figure 16:
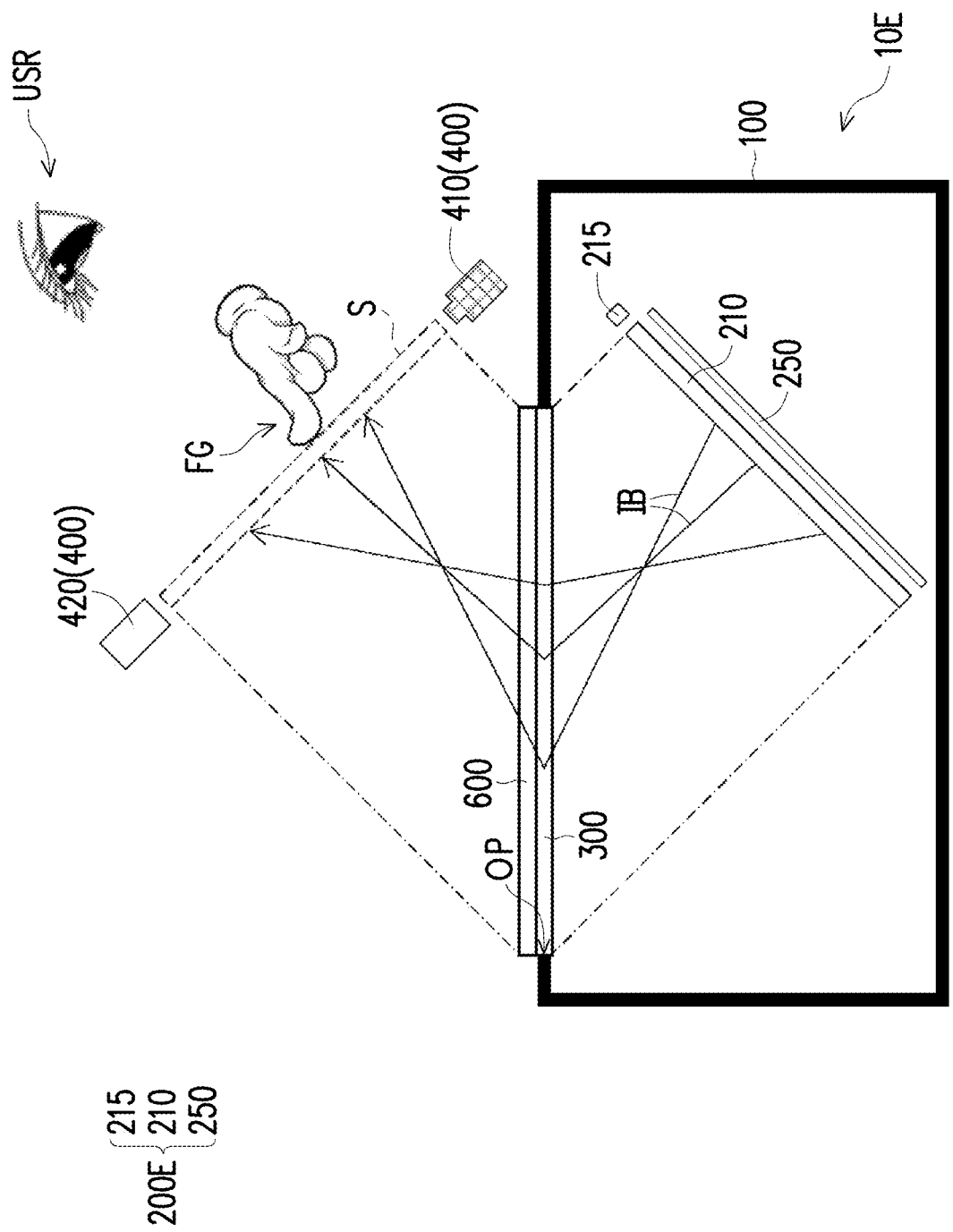
FIG. 16 is a schematic side view of a touch display apparatus according to an eighth embodiment of the disclosure.

FIG. 16 is a schematic side view of a touch display apparatus according to an eighth embodiment of the disclosure. Referring to FIG. 16, a difference between a touch display apparatus 10E of the embodiment and the touch display apparatus 10 of FIG. 1 is that the touch display apparatus 10E further includes a viewing angle control sheet 600, which is disposed to overlap the light control element 300.

In this embodiment, the viewing angle control sheet 600 is disposed on a transmission path of the image beams IB coming from the light control element 300, but the disclosure is not limited thereto. In other embodiments, the viewing angle control sheet 600 may also be disposed on a transmission path of the image beams IB transmitted between the display module 200 and the light control element 300. The viewing angle control sheet 600 is, for example, a louver film of 3M, PICASUS VT of Toray, or a polarization viewing angle control element. Through the configuration of the viewing angle control sheet 600, a viewing angle range of the image frame in the imaging space S may be reduced, which helps to improve an anti-peep performance of the touch display apparatus 10E during operation.

In summary, in the touch display apparatus of an embodiment of the disclosure, the light control element is adapted to reflect the image beams emitted by the display module located on one side thereof into the imaging space located on the other side thereof. Through the self-luminous characteristic of the display module, the light energy utilization efficiency of the touch display apparatus is effectively improved. On the other hand, by arranging the touch module around the imaging space, an assembling alignment process of the touch display apparatus is effectively simplified, and overall production costs are thereby reduced.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A touch display apparatus, comprising:
    a body, having an opening;
    a display module, disposed in the body, adapted to emit a plurality of image beams toward the opening;
    a light control element, disposed to overlap the opening of the body, wherein the light control element is adapted to reflect the image beams coming from the display module to an imaging space to display an image frame of the display module, and the imaging space and the display module are located on two opposite sides of the light control element; and
    a touch module, disposed on one side of the light control element, configured to recognize a touch operation of a user in the imaging space, wherein the light control element has a plurality of first mirror surfaces and a plurality of second mirror surfaces, the first mirror surfaces are spaced apart from each other and extend in a first direction, the second mirror surfaces are spaced apart from each other and extend in a second direction, the first mirror surfaces are overlapped with the second mirror surfaces, and the first direction intersects the second direction.

2. The touch display apparatus according to claim 1, wherein the display module comprises:
    a first light guide plate, having a first light incident surface and a first bottom surface connected to the first light incident surface;
    a first light source, disposed at one side of the first light incident surface of the first light guide plate; and a plurality of first optical microstructures, disposed on the first bottom surface of the first light guide plate, wherein the first optical microstructures form a first image pattern.

3. The touch display apparatus according to claim 2, wherein the display module further comprises a reflector disposed on one side of the first bottom surface of the first light guide plate.

4. A touch display apparatus, comprising:
a body, having an opening;
a display module, disposed in the body, adapted to emit a plurality of image beams toward the opening, the display module comprises:
   a first light guide plate, having a first light incident surface and a first bottom surface connected to the first light incident surface;
   a first light source, disposed at one side of the first light incident surface of the first light guide plate; and
   a plurality of first optical microstructures, disposed on the first bottom surface of the first light guide plate, wherein the first optical microstructures form a first image pattern;
a light control element, disposed to overlap the opening of the body, wherein the light control element is adapted to reflect the image beams coming from the display module to an imaging space to display an image frame of the display module, and the imaging space and the display module are located on two opposite sides of the light control element; and
a touch module, disposed on one side of the light control element, configured to recognize a touch operation of a user in the imaging space, wherein the display module further comprises a self-luminous display panel disposed on one side of the first bottom surface of the first light guide plate.

5. The touch display apparatus according to claim 2, wherein the display module further comprises:
a second light guide plate, having a second light incident surface and a second bottom surface connected to the second light incident surface;
a second light source, disposed at one side of the second light incident surface of the second light guide plate; and
a plurality of second optical microstructures, disposed on the second bottom surface of the second light guide plate, wherein the second optical microstructures form a second image pattern, the image frame is composed of the first image pattern and the second image pattern, and imaging positions of the first image pattern and the second image pattern in the imaging space are different from each other.

6. The touch display apparatus according to claim 1, wherein the display module is a self-luminous display panel.

7. A touch display apparatus, comprising:
a body, having an opening;
a display module, disposed in the body, adapted to emit a plurality of image beams toward the opening;
a light control element, disposed to overlap the opening of the body, wherein the light control element is adapted to reflect the image beams coming from the display module to an imaging space to display an image frame of the display module, and the imaging space and the display module are located on two opposite sides of the light control element;
a touch module, disposed on one side of the light control element, configured to recognize a touch operation of a user in the imaging space; and
a rotating mechanism, disposed on the body, wherein the rotating mechanism is adapted to drive the light control element, the display module, and the imaging space to rotate synchronously along a rotating shaft, and the rotating shaft is parallel to a light emitting surface of the display module and a surface of the body provided with the light control element.

8. The touch display apparatus according to claim 1, further comprising:
a Fresnel lens, disposed on a transmission path of the image beams coming from the light control element.

9. The touch display apparatus according to claim 1, further comprising:
a touch prompt element, adapted to send a prompt signal after the touch module detects the touch operation of the user.

10. The touch display apparatus according to claim 9, wherein the touch prompt element is an air jet element.

11. The touch display apparatus according to claim 1, further comprising:
a viewing angle control sheet, disposed to overlap the light control element, located on a transmission path of the image beams.

12. The touch display apparatus according to claim 11, wherein the viewing angle control sheet is disposed on the transmission path of the image beams passing through the light control element.

13. The touch display apparatus according to claim 1, wherein the touch module comprises:
a plurality of transmitters and a plurality of receivers, disposed around the imaging space, wherein the transmitters are used to send a plurality of detection signals, and the receivers are adapted to receive at least a part of the detection signals to recognize the touch operation of the user.

14. The touch display apparatus according to claim 13, wherein the detection signals are infrared light or ultrasound.

15. The touch display apparatus according to claim 1, wherein the display module and the imaging space are mirror-symmetrical while treating the light control element as a center of symmetry.

16. The touch display apparatus according to claim 1, wherein the display module is disposed obliquely relative to the light control element.

* * * * *